Inventor:
William F. Spang,
by Kenway, Jenney, Witter & Hildreth
Attorneys

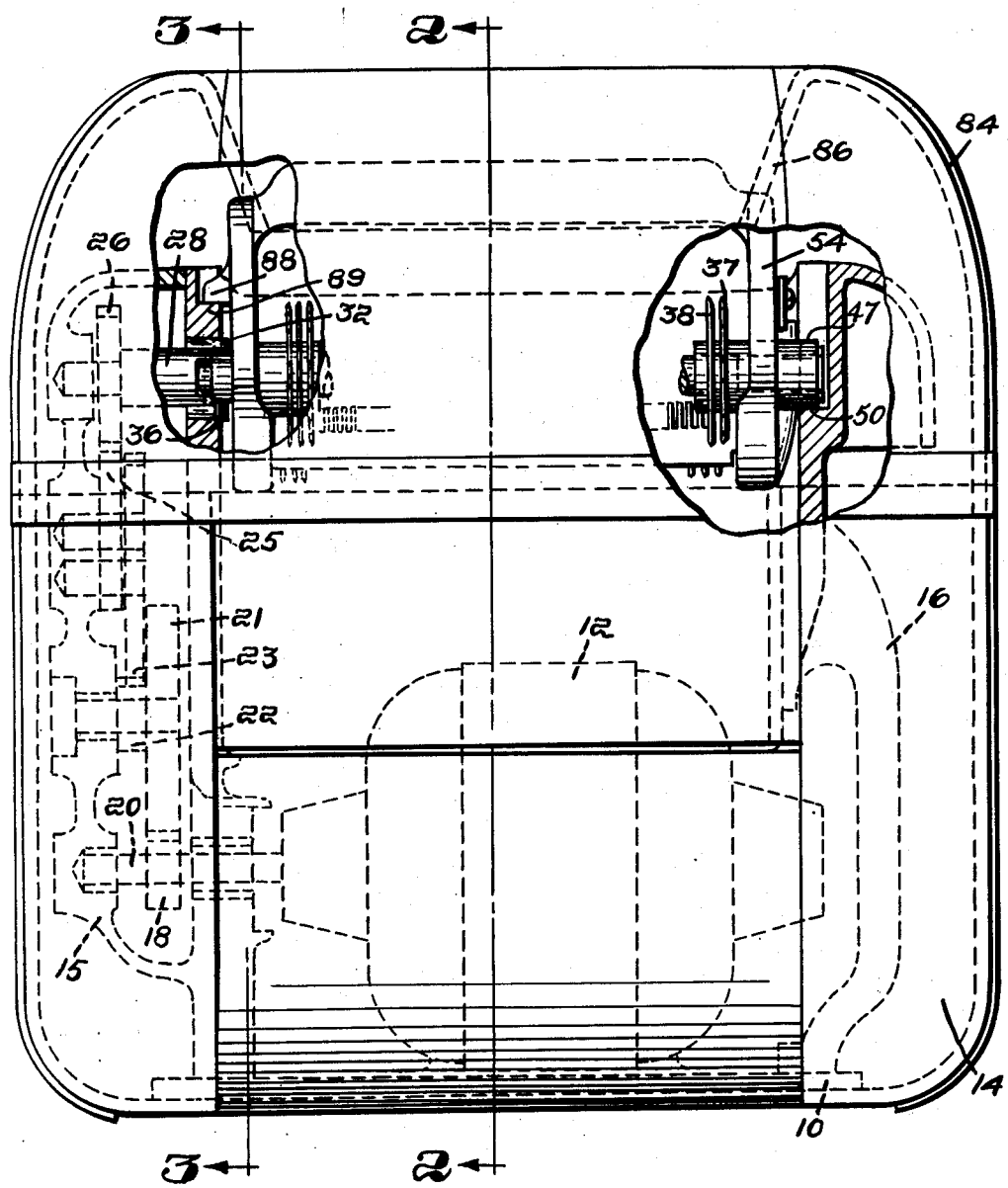

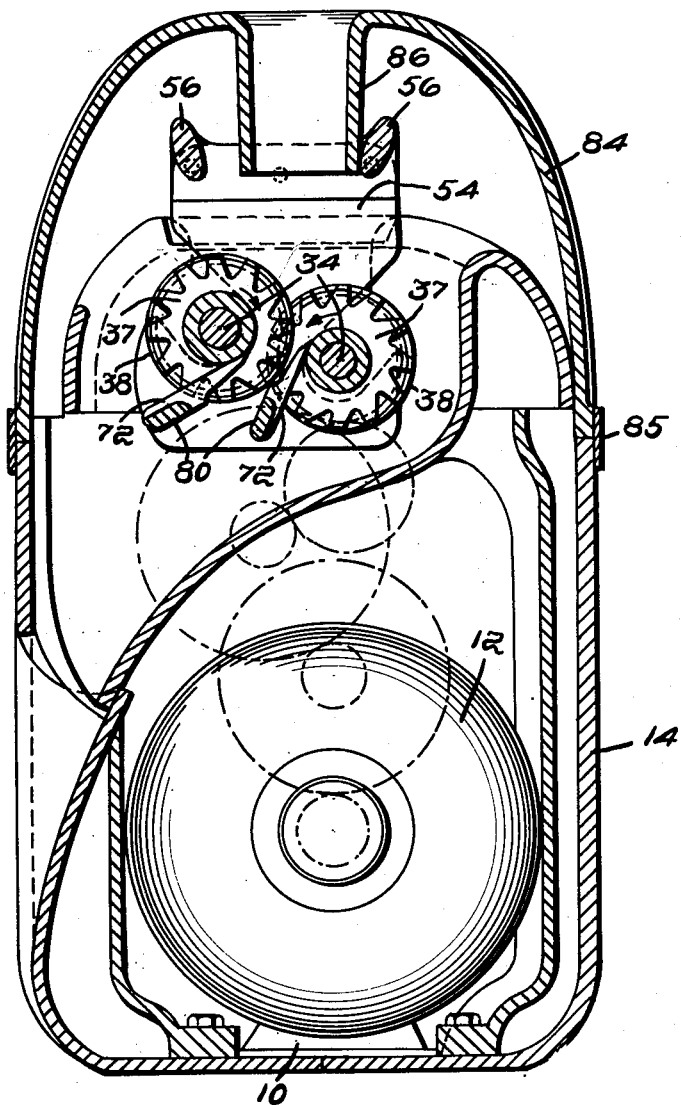

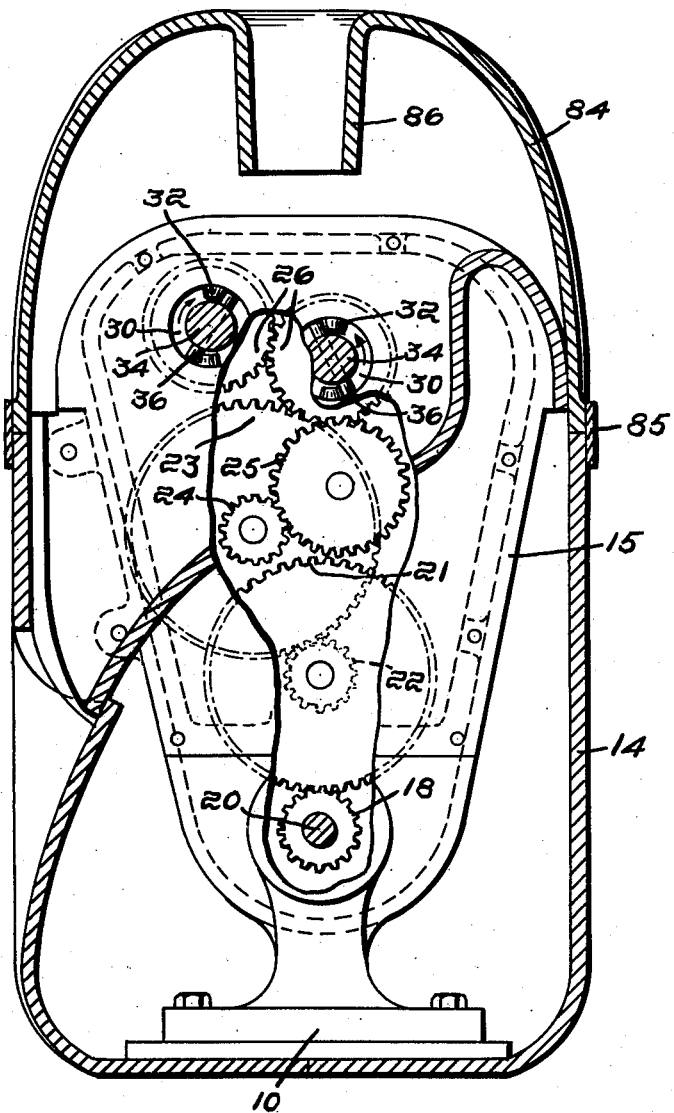

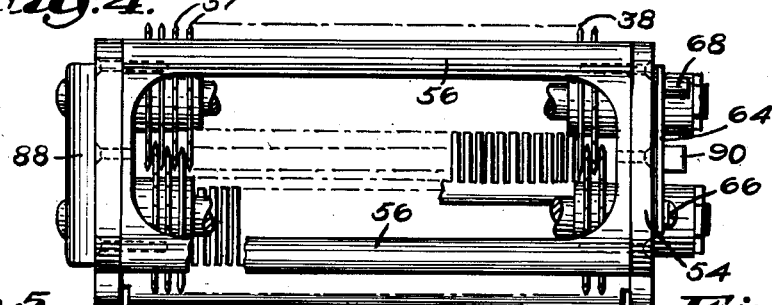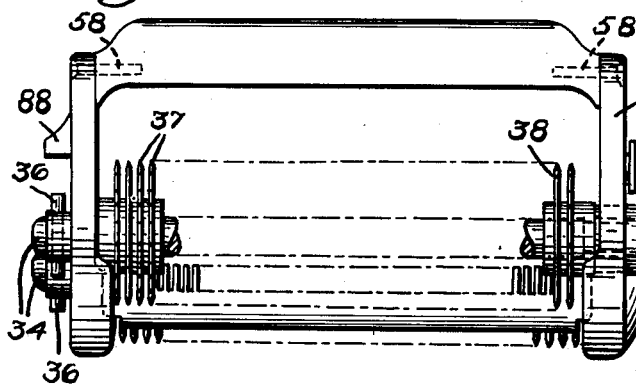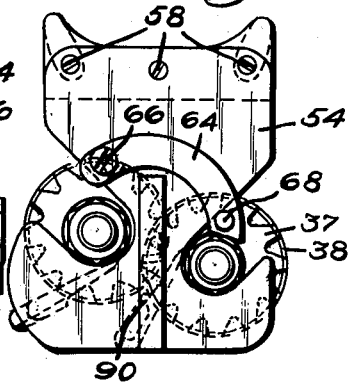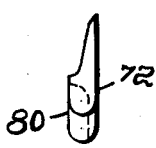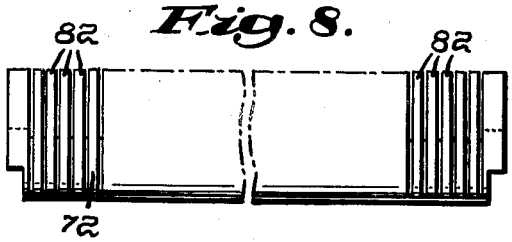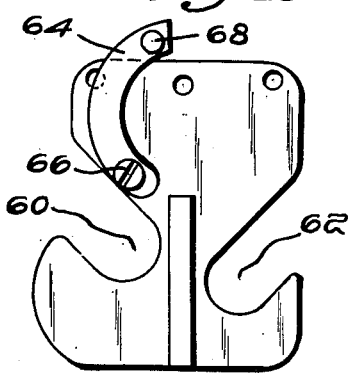

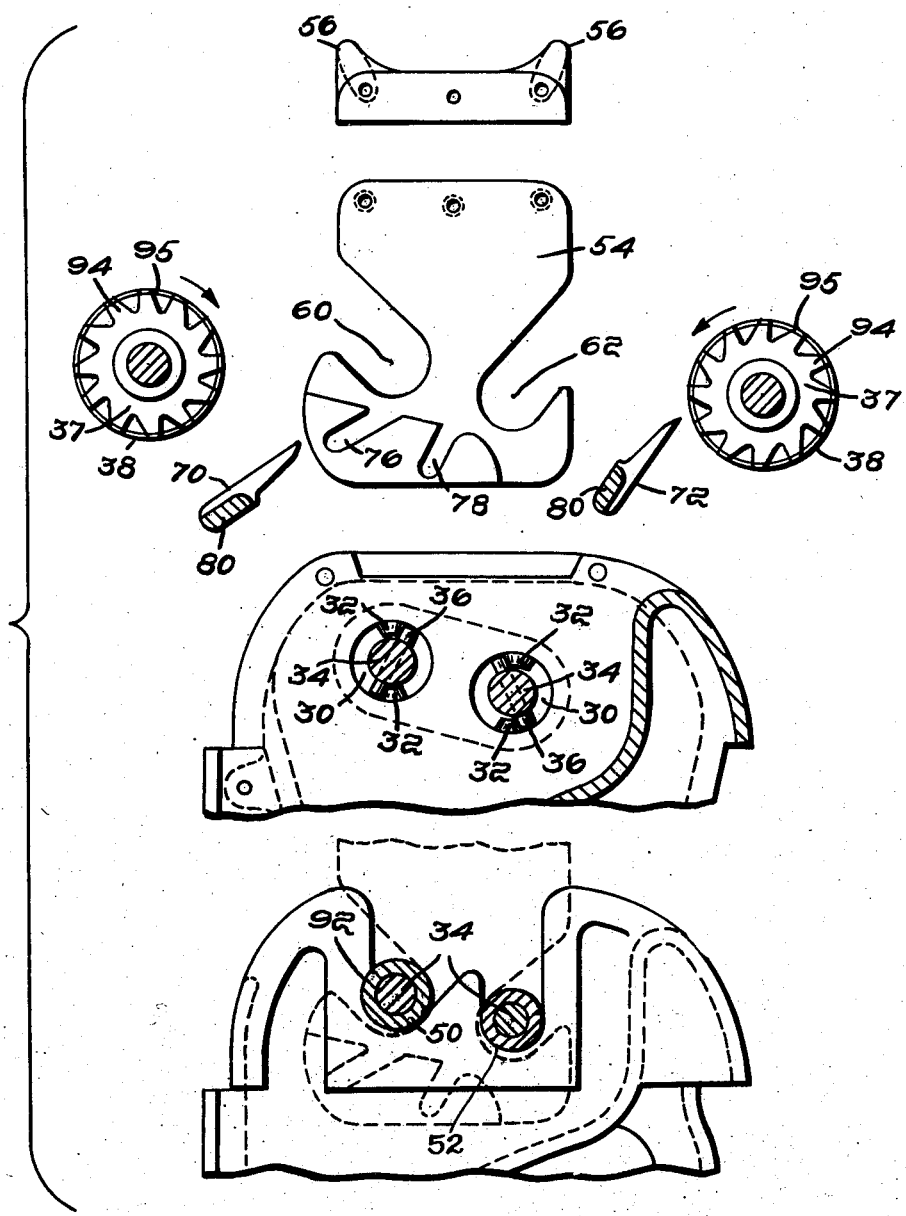

Patented Aug. 5, 1952

2,605,497

UNITED STATES PATENT OFFICE 2,605,497

MEAT TREATING MACHINE

William F. Spang, Cambridge, Mass., assignor to Cube Steak Machine Co., Needham Heights, Mass., a partnership Application January 28, 1949, Serial No. 73,292

10 Claims. (Cl. 17—26)

This invention relates to a machine for tenderizing meat by cutting or slitting the meat as it is passed through and between a pair of cylindrical gang cutters embodying cutting and slitting discs that cut the meat along parallel lines from either or both faces. It is desirable that the cutters shall be conveniently removable as a unit for cleaning and storage in a refrigerator when not in use and the primary object of the invention is the provision of novel mechanism for serving these functions.

The improved machine embodies driving means including rotary clutch elements for receiving and supporting the cutters at the inner ends and open bearings for receiving and supporting the outer ends of the cutters. Also associated with the cutters is a basket having end portions disposed beneath the ends of the cutters and adapted to lift both cutters as a unit from the bearings and clutch elements. The cutters are rotatably supported in the machine independently of the basket and means associated with the open bearings is provided for preventing upward movement of the cutters when the cutters are supported in the bearings and operating on a piece of meat, the construction permitting free removal of the cutters by the basket. Other means is provided for maintaining the cutters in predetermined position longitudinally as and for the purpose hereinafter more specifically described.

Also associated with the basket and freely removable therefrom for cleaning is a pair of meat stripping plates or combs. These combs include fingers disposed between the cutting discs and so cooperating with spacers therebetween that scrap meat falling between the discs is directed inwardly between the cutters and the spaces between the discs is kept clean and sanitary. The production of an improved machine embodying these and other novel features, including an inclined abutment on the basket for automatically wedging and holding the parts in secure position and a latch for securing the cutters in the basket, comprises a further object of the invention.

These and other features of the invention will be best understood and appreciated from the following description of a preferred embodiment thereof selected for purposes of illustration and shown in the accompanying drawings in which—

Figure 11:
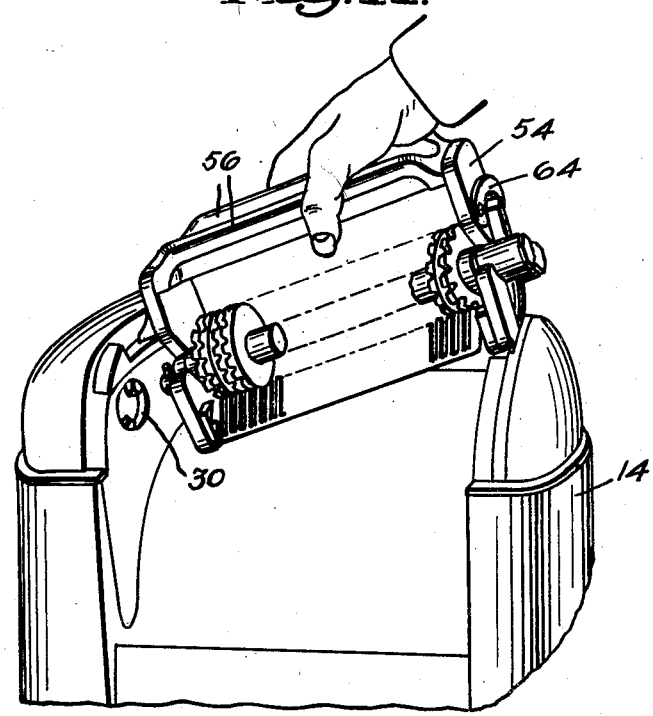
Figure 12:
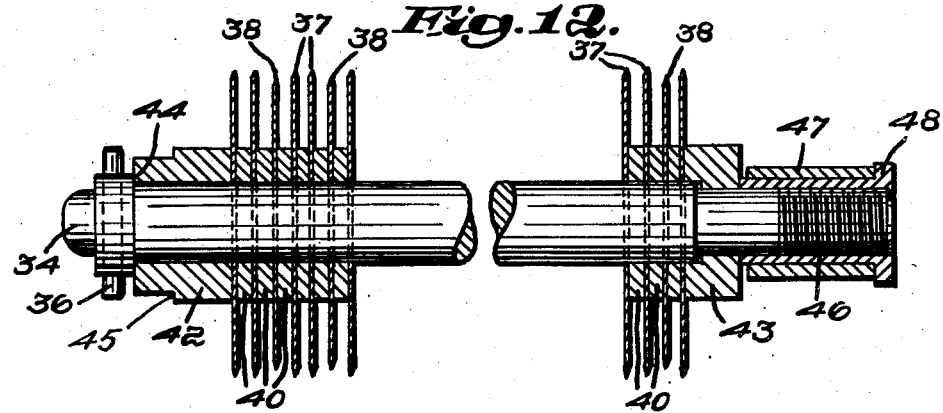

Fig. 1 is a front elevation, partially broken away, of a machine embodying the invention, Fig. 2 is a sectional view taken on line 2—2 of Fig. 1, Fig. 3 is a sectional view, with parts broken away, taken on line 3—3 of Fig. 1, Fig. 4 is a plan view of the basket and cutters, partly broken away, Fig. 5 is a side elevation thereof, Fig. 6 is an outer end elevation, Fig. 7 is an end elevation of a striping plate, Fig. 8 is a front elevation thereof, Fig. 9 is an exploded view of a portion of the machine, Fig. 10 is an outer end elevation of the basket, Fig. 11 illustrates the placing of the cutter unit in the machine, and Fig. 12 is an enlarged longitudinal sectional view of a gang cutter.

Referring now to the drawings by reference characters, 10 indicates a base supporting a motor 12 and housed within the lower part 14 of a casing. Also supported on the base 10 at one end of the motor is an upwardly extending gear box 15. Supported on the base at the other end of the motor is an upwardly extending frame 16 for cooperating with the gear box to support the cutters therebetween as hereinafter described.

The gear box houses a train of gears including a pinion 18 on the motor shaft 20 and intermeshing gears 21, 22, 23, 24 and 25. The gear 25 is in mesh with one of two intermeshing gears 26 respectively on two shafts 28 rotatably supported in the top portion of the gear box. These two shafts extend into openings 30 in the gear box and provide clutch elements including driving studs 32. The clutch elements are adapted to receive the inner ends of cutter shafts 34 and the studs 32 are adapted to cooperate with pins 36 carried by the shafts 34 to drive the cutters. The front faces of the studs are rounded to guide the pins 36 to a position between the studs.

The two gang cutters illustrated are of like construction and each embodies a shaft 34 having disc cutters 37 and 38 in spaced relation thereon and therealong. The discs 37 have interrupted peripheries provided with knife-like blades to puncture and knit the meat and the discs 38 have continuously sharp peripheries to slit the meat and cut through its fibres. Any desired arrangement of discs can be employed and the arrangement illustrated is that shown and described in Patent 2,360,729. The discs are held in spaced relation by annular spacers 40 therebetween. Disposed on each shaft in contact with the outer faces of the end discs are two collars 42 and 43. The collar 42 rests against a shoulder 44 integral with the shaft and a bushing 46 threaded to the shaft is in abutting contact with the collar 43 to hold the parts in assembled relation. A bushing 47 is mounted for free rotation on the bushing 46 and is held thereon by an annular shoulder 48 integral with the bushing 46.

The inner end of each shaft 34 is adapted to be supported and driven by a shaft 28 and the bushing 47 on the outer end is adapted to be received and supported within an open U-shaped bearing in the frame 16. Two such bearings 50 and 52 are provided. The bearing 50 and its bushing are somewhat larger than the bearing 52 and its bushing so that the front and rear cutters will always be properly located in the machine. Also the front bearing 50 and its corresponding shaft 28 are at a somewhat higher elevation for a purpose hereinafter described. While the two gang cutters are supported wholly by the bearings 50 and 52 and shafts 28 during operation of the machine, it is desirable that provision be made for removal and replacement of the cutters as a unit. I have provided a basket of the following described nature for this purpose. The basket is adapted to lift the cutters from the machine and support them for convenient handling as illustrated in Figs. 4–6.

The basket illustrated comprises two end plates 54 rigidly connected by a lifting handle embodying two spaced elements 56 disposed above and extending longitudinally of the cutters. The space between the elements is disposed directly above the junction of the two cutters and permits the passage of meat therethrough to the cutters. The plates and handle are connected by screws 58. Each plate 54 is provided with two U-shaped openings 60 and 62 converging downwardly, the opening 60 being higher than the opening 62 to correspond to the bearings 50 and 52. The cutters are supported in the openings 60 and 62 as illustrated in Figs. 4–6. Furthermore, the basket serves the function of holding the two cutters in proper relation longitudinally. As illustrated in Fig. 4, the discs of each cutter are alternately disposed between the discs of the other cutter. The collars 42 and 43 on the ends of the cutters are in abutting contact with the basket plates 54 which thus serve relatively to align the cutters in proper axial position in the basket. A shoulder 45 on the collar 42 engages its plate 54.

While it is desirable that the cutters shall be conveniently removable from the basket it is also desirable that they shall not accidentally drop out should the basket be inverted. For performing this function I provide a latch 64 pivotally secured to the outer plate at 66 and having an operating stud 68 at its free end. The threaded stud 66 holds the latch in resilient frictional contact with the plate and when the latch is in the open position of Fig. 10 the cutters are freely removable. In the position of Fig. 6, the latch holds both cutters against upward movement outwardly of the openings. The threaded stud 68 extends through and beyond the latch to engage a margin of the plate and thus serves as a detent to keep the latch in closed position. Resiliency of the latch permits its outward movement to a position disengaging the detent and permitting the latch to pivot.

The basket serves the additional function of supporting a pair of meat stripping plates or combs 70 and 72. The inner faces of each basket plate 54 is provided with two open inclined channels 76 and 78 for receiving and supporting the stripper plates which have end portions 80 formed to fit within the channels. Each stripper plate embodies a plurality of fingers 82 substantially equal in width to the spacers 40 and having converging and upwardly extending sharp ends respectively closely adjacent to or in contact with the peripheries of the spacers when in operative position. (Fig. 6). These fingers serve to scrape meat scrap from the spacers and the spaces between the disc and direct it inwardly between the stripper plates as the cutters are rotated inwardly and downwardly. The cutter unit is thereby rendered self-cleaning and sanitary. It will be apparent that the cutters and strippers are thus removable from the machine as a unit and can be readily disassembled for cleaning or repair as required.

The casing 14 has a removable cover portion 84 adapted to rest on the lower portion 14 within a band 85 carried by the portion 14. The cover 84 is provided with a meat guiding chute 86 disposed over the junction of the two cutters as shown in Figs. 1 and 2. The basket 54—56 is inserted in the machine in the manner illustrated in Fig. 11. A guide bar 88 on the inner plate 54 is placed in contact with a depressed abutment 89 on the gear box and the basket is then lowered to horizontal position with the bushings 47 engaged within the bearings 50 and 52. During this movement an inclined abutment 90 on the outer plate 54 engages the frame 16 and wedges the basket and cutters inwardly longitudinally of the cutters and holds the basket and parts in this position.

The openings 60 and 62 in the basket are somewhat wider than the bushings 47 whereby the cutter supporting portions of the basket drop below and out of supporting engagement with the cutters when the cutters are supported in the bearings 50 and 52, and the basket then rests on the bushings (Fig. 9). Whereas the bearing 52 is U-shaped vertically, the bearing 50 is undercut and so disposed that its bottom portion extends laterally away from the bearing 52 and provides an overhanging wall at 92 preventing upward movement of the bushing and shaft supported in the bearing 50. Both cutters are supported against upward movement from their bearings 50 and 52 by means of the overhang at 92 as hereinafter described but are free to be lifted therefrom by the basket.

It will now be apparent that the cutters are rotatably supported for operation in the machine independently of the basket. Such construction permits the two cutters to be removed as a unit with the basket and either or both cutters to be replaced in operative position in the machine independently of the basket. Thus supporting a cutter independently in the machine permits convenient sharpening and cleaning of the cutters independently of the other parts and without danger of affecting or damaging such parts or of bringing filings or other foreign matter into contact with them. It is furthermore pointed out that by providing means other than the basket for supporting the stripping plates, the cutters can be employed in the frame for cutting meat independently of the basket. The front cutter being at a higher elevation tends to climb when rotated in working contact with the meat but such climbing is prevented by the overhanging shoulder at 92. The rear cutter, being at an elevation below the front cutter, does not have as much tendency to climb and is maintained in its bearing by the downward thrust of the front cutter on the meat. Thus the overhanging shoulder 92 serves its holding function either with or without the basket.

The two gang cutters are rotated in opposite directions inwardly and downwardly at their junction, and operate on both sides of the meat to slit the meat along parallel lines and knit together any loose or free portions. Such operation of the cutters on the meat therebetween crowds the cutters laterally outward, thus crowding and holding the higher cutter bushing 47 in the undercut portion 92 of its bearing and preventing its upward movement. The companion cutter is likewise held against upward movement by the downward thrust of the higher cutter on the meat. The discs 37 which serve the knitting function embody outwardly extending blades 93 and I preferably cut away the front or leading corners of these blades at 95 so that they will readily pass outwardly of the meat and each blade will still retain its relatively wide base which gives strength to the blade and forms relatively long cuts in the meat.

Having thus disclosed my invention what I claim as new and desire to secure by Letters Patent is:

1. A meat tendering machine comprising a frame, a pair of relatively adjacent cylindrical members each including a shaft and one having a plurality of cutting discs in spaced relation on and along the shaft, driving means including two rotary clutch elements in the frame for receiving and drivingly supporting the inner ends of the shafts, two U-shaped open bearings in the frame for receiving and rotatably supporting the outer ends of the shafts, the members being parallel and in cooperating relation as thus supported, and a removable basket in the frame having end portions disposed beneath the ends of the shafts and adapted to lift the two members as a unit from said bearings and clutch elements, the ends of the shafts extending outwardly beyond the basket and supported by said clutch elements and in said U-shaped open bearings.

2. The machine defined in claim 1 in which the basket embodies two member-lifting end plates rigidly connected by a portion of the basket extending longitudinally of the cutters, each of said plates having two open U-shaped openings therein for receiving and supporting the ends of the shafts and from which the members are freely removable.

3. The machine defined in claim 1 in which the basket embodies two member-lifting end plates each having two U-shaped openings therein for receiving and supporting the ends of the shafts and from which the members are freely removable and a latch carried by one of the plates and movable to a position preventing removal of the members from the two openings in the plate.

4. The machine defined in claim 1 in which the basket embodies two member-lifting end plates each having two U-shaped openings therein for receiving and supporting the ends of the shafts and from which the members are freely removable, the basket having an overhanging wall at each opening for engaging and supporting the basket on the shafts.

5. The machine defined in claim 1 plus means for supporting the basket in the frame with its shaft-engaging and supporting portions disposed below and out of supporting engagement with the members when the members are supported in the frame by said clutch elements and bearings.

6. The machine defined in claim 1 in which said clutch elements and bearings rotatably support the members at their ends in the frame independently of the basket.

7. The machine defined in claim 1 plus means including an overhanging abutment associated with one of the bearings for preventing upward climbing movement of the members when the members are supported in the bearings and operating on work therebetween but permitting free removal of the members by the basket.

8. The machine defined in claim 1 in which the bottom portion of one of said open bearings is undercut laterally away from the other bearing and provides an overhanging wall preventing upward movement of the shaft supported in such bearing.

9. A lifting basket for use in a meat tendering machine having two relatively long, parallel and cooperating rotary cylindrical meat tendering members each having axially disposed shaft ends extending outwardly thereof, comprising two spaced and parallel end plates, means connecting the ends plates and including a lifting handle connected at its ends to the plates, and supporting abutments at the bottoms of open U-shaped sockets in the end plates for receiving said shaft ends and lifting said two members simultaneously as a unit.

10. The lifting basket defined in claim 9 plus two stripper units for cooperating with said cylindrical members supported at their ends on said end plates and spanning the gap therebetween.

WILLIAM F. SPANG.

REFERENCES CITED

The following references are of record in the file of this patent:

UNITED STATES PATENTS

| Number | Name | Date |
|---|---|---|
| 386,226 | Welch | July 17, 1888 |
| 532,858 | Baum | Jan. 22, 1895 |
| 2,310,067 | Doering et al. | Feb. 2, 1943 |
| 2,398,636 | Henney et al. | Apr. 16, 1946 |
| 2,450,688 | Richard | Oct. 5, 1948 |
| 2,513,025 | Jackson | June 27, 1950 |